(12) United States Patent
Kang et al.

(10) Patent No.: US 6,226,014 B1
(45) Date of Patent: May 1, 2001

(54) ELLIPSE FILLING GRAPHICS METHOD

(75) Inventors: Hwa-seok Kang, Seoul; Seung-ki Sung, Suwon, both of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/069,976

(22) Filed: Apr. 30, 1998

(30) Foreign Application Priority Data

Jul. 15, 1997 (KR) .................................................. 97-32938

(51) Int. Cl.$^7$ .................................................. G06T 11/20
(52) U.S. Cl. .......................................................... 345/441
(58) Field of Search ..................................... 345/441, 418

(56) References Cited

FOREIGN PATENT DOCUMENTS 62-72078   2/1987   (JP) .
6-83971    3/1994   (JP) .

*Primary Examiner*—Mark Zimmerman
*Assistant Examiner*—Philip H. Stevenson
(74) *Attorney, Agent, or Firm*—Sughrue, Mion, Zinn, Macpeak & Seas, PLLC

(57) ABSTRACT

An ellipse filling graphics method in which the interior of an ellipse is filled with a single color by writing color data to memory positions designated by addresses corresponding to pixels in the ellipse, comprises the steps of (a) selecting a rectangle which is included in the ellipse, (b) writing color data to memory positions designated by addresses corresponding to pixels inside the selected rectangle, and (c) writing color data to memory positions designated by addresses corresponding to pixels inside the ellipse but outside the selected rectangle. The filling method requires $2(\sqrt{a^2+b^2}-a)$ fewer line drawing operations to fill an ellipse, and about 0.8r fewer line drawing operations to fill a circle, compared to a conventional method.

2 Claims, 2 Drawing Sheets

ELLIPSE FILLING GRAPHICS METHOD

BACKGROUND OF THE INVENTION

1. Field of the Invention

The present invention relates to an ellipse filling graphics method, and more particularly, to a method for filling the interior of an ellipse with a single color by writing predetermined color data to memory positions corresponding to pixels in the ellipse being a basic graphics figure.

2. Description of Related Art

In general, graphic displays are used in a wide range of fields, for example, the graphic user interface of computers. When an object is expressed in such fields, it is divided into dots, lines, triangles, rectangles, circles or ellipses. Circles and ellipses in particular require extensive processing time. In addition, it takes a lot of time to fill the interiors of the circle and the ellipse with a color.

FIG. 1 shows a conventional circle filling method. It is assumed for convenience's sake that the center of the circle in FIG. 1 is at the origin (0,0) of a coordinate system. First, when the circumference of the circle is divided by 8, a point (x,y) on a first octant is obtained by moving one pixel at a time from a point (0,r) to a point where x is equal to y, using a well-known midpoint circle algorithm. Points (-x,y), (y,x), (-y,x), (y,-x), (-y,-x), (x,-y), and (-x,-y) are calculated from the point (x,y) on the first octant. Then, the points in positions symmetrical with respect to the y axis are connected to each other by straight lines, whereby the circle is filled. That is, each pair of the points (x,y) and (-x,y), (y,x) and (-y,x), (y,-x) and (-y,-x), and (x,-y) and (-x,-y) are connected to each other by a straight line. This procedure repeats from the point (0,r) to the point where x is equal to y.

An ellipse case corresponds to an extension of the circle case. FIG. 2 shows a conventional ellipse filling method. The circumference of an ellipse is divided into four quadrants to utilize the symmetry of ellipses. It is assumed for convenience's sake that the origin of the ellipse in FIG. 2 is at a point (0,0) as in the case of FIG. 1. When half the major axis of the ellipse (hereinafter referred to as the long radius of the ellipse) is a and half the minor axis of the ellipse (hereinafter referred to as the short radius thereof) is b, a point (x,y) on the circumference of the first quadrant is obtained by moving one pixel at a time from a point (0,b) to a point (a,0). Points (-x,y), (x,-y) and (-x,-y) are obtained from the point (x,y). The points (x,y) and (-x,y) are connected to each other by a straight line, and likewise for the points (x,-y) and (-x,-y). This procedure repeats between the points (0,b) and (a,0).

However, in the method of drawing a circle or an ellipse, the interiors of the circle and the ellipse are filled by drawing 2r and 2b straight lines, respectively, which requires a lot of processing time.

SUMMARY OF THE INVENTION

It is an object of the present invention to provide an ellipse filling graphics method by which processing speed is increased, by filling a rectangle within a circle or an ellipse through fast memory block copying, and drawing straight lines only in the remaining portion.

To accomplish the above object, there is provided an ellipse filling graphics method in which the interior of an ellipse is filled with a single color by writing color data to memory positions designated by addresses corresponding to pixels in the ellipse, the method comprising the steps of: (a) selecting a rectangle which is included in the ellipse; (b) writing color data to memory positions designated by addresses corresponding to pixels inside the selected rectangle; and (c) writing color data to memory positions designated by addresses corresponding to pixels inside the ellipse but outside the selected rectangle.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 1:
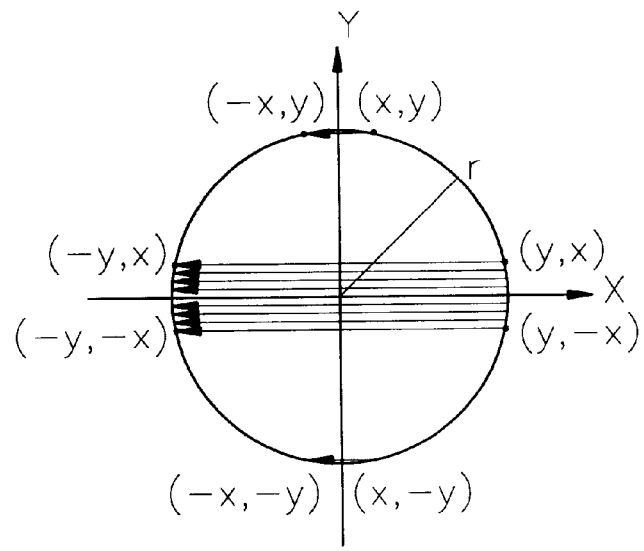
FIG. 1 shows a conventional circle filling graphics method.
Figure 2:
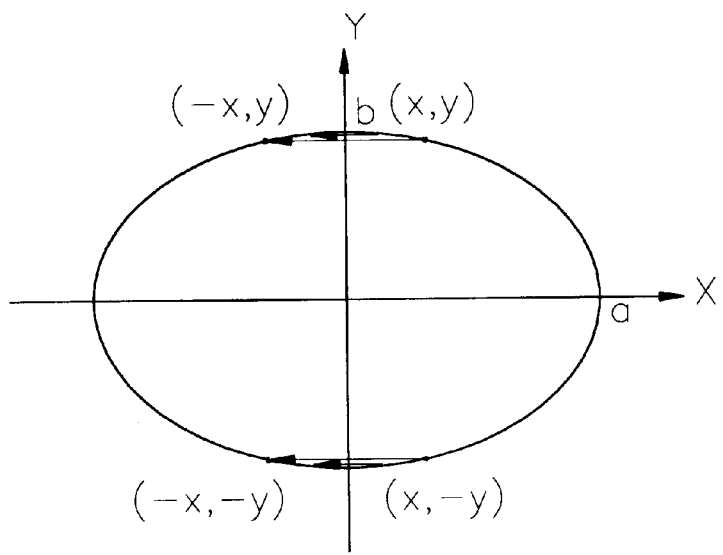
FIG. 2 shows a conventional ellipse filling graphics method.
Figure 3:
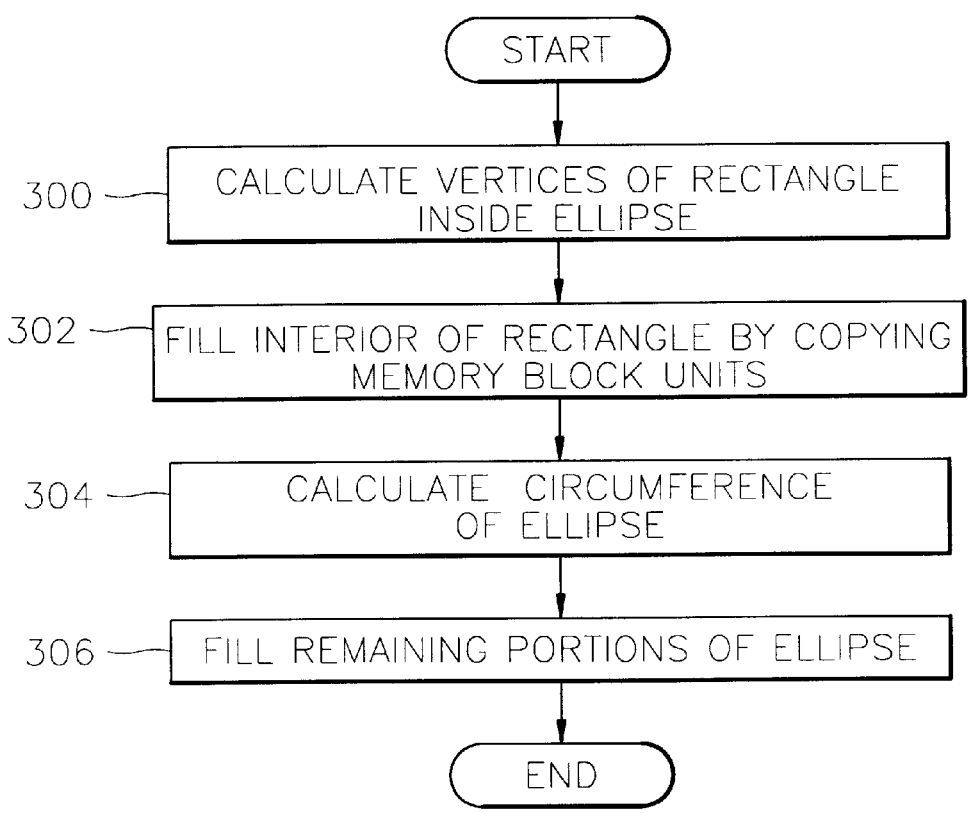
FIG. 3 is a flow chart representing an ellipse filling graphics method according to the present invention.

The method of FIG. 3 considers a rectangle which lies within an ellipse and of which the corners (vertices) lie on the circumference of the ellipse.

In the ellipse filling method according to the present invention, first, a rectangle included in the interior of an ellipse is selected. Color data is written to memory positions corresponding to pixels inside the selected rectangle. Then, the color data is written to memory positions corresponding to the remaining ellipse portions outside the selected rectangle area, thereby completing the filling of the interior of the ellipse.

Referring to FIG. 3, the ellipse filling graphics method is comprised of the steps of: (300) calculating the respective vertices of a rectangle which lie on the circumference of the ellipse; (302) filling the inside of the rectangle; (304) calculating the circumference of an ellipse; and (306) filling the remaining portions of the ellipse. Here, since a circle corresponds to a special case of the ellipse, the ellipse case is discussed first.

First, the vertices of the rectangle which touch the circumference of the ellipse are calculated in step 300. The rectangle can be filled by simultaneously filling a predetermined number of adjacent memory cells with equal values, on account of the two dimensional matrix structure of the memory. Accordingly, the respective vertices of an inscribed rectangle are calculated to write color data to the memory positions corresponding to all the internal pixels of the rectangle simultaneously through memory block copying. According to the ellipse shown in FIG. 4, assuming that the ellipse is expressed by $$\frac{x^2}{a^2} + \frac{y^2}{b^2} = 1,$$

the long radius of the ellipse is a, the short radius thereof is b, and the origin thereof is at a point (0,0), then a vertex of the rectangle is defined as the point A where a tangent line $(y=-x+\sqrt{a^2+b^2})$, which is tangent to the ellipse in a first quadrant and has an inclination of -1, intersects the ellipse. Note that the X axis corresponds to the major axis of the ellipse, and the Y axis corresponds to the minor axis of the ellipse. The point of intersection in the first quadrant of the ellipse is $$\left(\frac{a^2}{\sqrt{a^2+b^2}}, \frac{b^2}{\sqrt{a^2+b^2}}\right).$$

For a circle, the values a and b are both equal to a value r (where r is the radius of a circle), so that the point of intersection of a circle is $$\left(\frac{r}{\sqrt{2}}, \frac{r}{\sqrt{2}}\right).$$

When the vertex A is determined, vertices $$\left(-\frac{a^2}{\sqrt{a^2+b^2}}, \frac{b^2}{\sqrt{a^2+b^2}}\right), \left(-\frac{a^2}{\sqrt{a^2+b^2}}, -\frac{b^2}{\sqrt{a^2+b^2}}\right) \text{ and }$$

$$\left(\frac{a^2}{\sqrt{a^2+b^2}}, -\frac{b^2}{\sqrt{a^2+b^2}}\right)$$

are determined in second, third and fourth quadrants, symmetrical to the vertex A. For the circle, the corresponding vertices are $$\left(-\frac{r}{\sqrt{2}}, \frac{r}{\sqrt{2}}\right), \left(-\frac{r}{\sqrt{2}}, -\frac{r}{\sqrt{2}}\right),$$

and $$\left(\frac{r}{\sqrt{2}}, -\frac{r}{\sqrt{2}}\right).$$

The rectangle formed using the above vertices can be filled quickly due to the above-described memory block copying in step 302.

Figure 4:
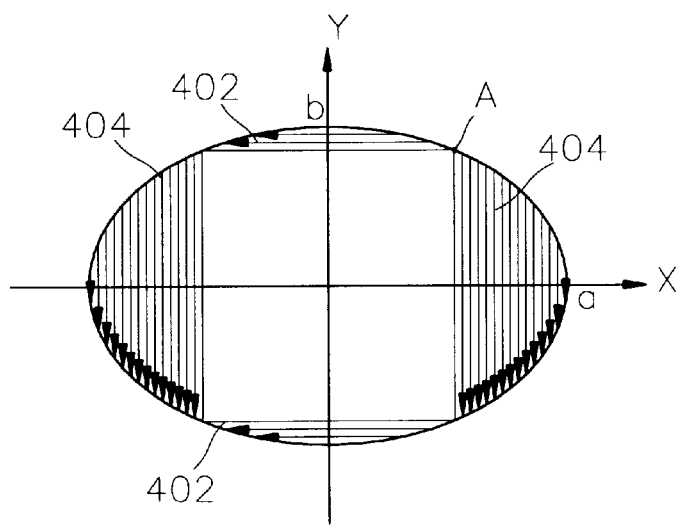
FIG. 4 illustrates the ellipse filling method of FIG. 3.

While a point (x,y) increases from a point (0,b) to a point $$\left(\frac{a^2}{\sqrt{a^2+b^2}}, \frac{b^2}{\sqrt{a^2+b^2}}\right)$$

by one pixel at a time, each pair of the points (x,y) and (−x,y), and (x,−y) and (−x,−y), are horizontally connected to each other, and color data is written to memory positions designated by addresses corresponding to the respective pixels of the horizontally-connecting lines. In this way, the portion 402 of FIG. 4 is filled among the remaining portions outside the rectangle. While a point (x,y) increases from a point (a,0) to a point $$\left(\frac{a^2}{\sqrt{a^2+b^2}}, \frac{b^2}{\sqrt{a^2+b^2}}\right)$$

by one pixel at a time, each pair of the points (x,y) and (x,−y), and (−x,y) and (−x,−y), are vertically connected to each other, and color data is written to memory positions designated by addresses corresponding to the respective pixels of the vertically-connecting lines. In this way, a portion 404 of FIG. 4 is filled.

Likewise for a circle, a point (x,y) increases from a point (0,r) to a point $$\left(\frac{r}{\sqrt{2}}, \frac{r}{\sqrt{2}}\right)$$

by one pixel at a time, and thus the point (x,y) on the circumference is calculated, in step 304. Each pair of the points (x,y) and (−x,y), and (x,−y) and (−x,−y), are horizontally connected to each other, while color data is written to memory positions designated by addresses corresponding to the respective pixels of the horizontally-connecting lines, in step 306. The point (x,y) increases from a point (r,0) to a point $$\left(\frac{r}{\sqrt{2}}, \frac{r}{\sqrt{2}}\right)$$

by one pixel at a time, and thus the point (x,y) on the circumference is calculated, in step 304. Each pair of the points (x,y) and (x,−y), and (−x,y) and (−x,−y), are vertically connected to each other, while color data is written to memory positions designated by addresses corresponding to the respective pixels of the vertically-connecting lines, in step 306.

The present invention relates to a method for quickly filling the interior of a circle or an ellipse, being basic graphics figures, with a given color. The method is widely applicable to a graphics accelerator board/chip and a graphics library.

The ellipse filling method according to the present invention requires one block copying operation and $$2a\left(1-\frac{a}{\sqrt{a^2+b^2}}\right)+2b\left(1-\frac{b}{\sqrt{a^2+b^2}}\right)$$

line drawing operations. That is, the number of line drawing operations decreases by $2(\sqrt{a^2+b^2}-a)$ compared to the conventional method. In the case of a circle, since the values a and b are both equal to the value r, the circle filling method according to the present invention requires one block copying operation and about 1.2r line drawing operations. That is, the number of line drawing operations decreases by about 0.8r compared to the conventional method. Therefore, the circle or the ellipse is filled more quickly.

What is claimed is:

1. An ellipse filling graphics method in which the interior of an ellipse is filled with a color by writing color data to memory positions designated by addresses corresponding to pixels in said ellipse, said method comprising the steps of:

(a) selecting a point on the circumference of said ellipse as a first vertex of a rectangle lying inside said ellipse, a point symmetrical to said first vertex with respect to the minor axis of said ellipse as a second vertex, a point symmetrical to said second vertex with respect to the major axis of said ellipse as a third vertex, and a point symmetrical to said third vertex with respect to the minor axis of said ellipse as a fourth vertex;

(b) writing color data to memory positions designated by addresses corresponding to the pixels inside a rectangle formed by connecting said first through fourth vertices of step (a) in order;

(c) selecting first points on the circumference of said ellipse while moving by one pixel at a time from an intersection of said ellipse with the minor axis to said first vertex, writing color data to memory positions designated by addresses corresponding to pixels on straight lines formed by connecting the first points to respective second points symmetrical to the first points with respect to the minor axis, and writing color data to memory positions designated by addresses corresponding to pixels on straight lines formed by connecting respective third points symmetrical to the first points with respect to the major axis to respective fourth points symmetrical to the third points with respect to the minor axis; and (d) selecting fifth points on the circumference of said ellipse while moving by one pixel at a time from an intersection of said ellipse with the major axis of said ellipse to said first vertex, writing color data to memory positions designated by addresses corresponding to pixels on straight lines formed by connecting the fifth points to respective sixth points symmetrical to the fifth points with respect to the major axis of said ellipse, and writing color data to memory positions designated by addresses corresponding to pixels on straight lines formed by connecting respective seventh points symmetrical to the fifth points with respect to the minor axis to respective eighth points symmetrical to the seventh points with respect to the major axis, wherein steps (a) through (d) are performed in sequential order.

2. The ellipse filling graphics method as claimed in claim 1, wherein said first vertex is a point where said ellipse intersects a tangent of said ellipse having a gradient of −1.

* * * * *